United States Patent [19]
Justin

[11] Patent Number: 5,926,894
[45] Date of Patent: Jul. 27, 1999

[54] APPARATUS FOR PREPARING THE SURFACE OF A CONTOURED ARTICLE

[76] Inventor: Louis K. Justin, 10778 W. Braemar Dr., Holly, Mich. 48442

[21] Appl. No.: 08/780,672

[22] Filed: Jan. 8, 1997

[51] Int. Cl.⁶ .................................................. B60S 3/04
[52] U.S. Cl. ............................. 15/97.3; 15/97.1; 15/53.1; 15/DIG. 2; 33/552
[58] Field of Search ..................................... 15/97.3, 97.1, 15/DIG. 2, 88.1, 53.3, 53.1, 201, 186, 231, 210.1, 236.05, 103; 33/552, 551, 553, 554, 557, 558; 134/6; 29/759, 281.5, 252

[56] References Cited

U.S. PATENT DOCUMENTS

| | | | |
|---|---|---|---|
| 2,170,792 | 8/1939 | Brooke | 51/62 |
| 2,215,692 | 9/1940 | Fleming | 51/192 |
| 2,482,928 | 9/1949 | Neff et al. | 15/186 |
| 2,607,939 | 3/1952 | Magnuson | 15/99 |
| 2,800,671 | 4/1957 | Nowak | 15/21 |
| 3,048,866 | 8/1962 | Thompson | 15/21 |
| 3,678,527 | 7/1972 | Ries | 15/99 |
| 3,709,184 | 1/1973 | Laney | 114/222 |
| 4,553,322 | 11/1985 | Cappos et al. | 29/759 |
| 4,614,002 | 9/1986 | Hata et al. | 15/53 A |
| 4,754,555 | 7/1988 | Stillman | 33/552 |
| 4,876,758 | 10/1989 | Rolloff et al. | 33/551 |

FOREIGN PATENT DOCUMENTS

| | | |
|---|---|---|
| 1956315 | 5/1971 | Germany . |
| 3208-527 | 11/1982 | Germany . |

OTHER PUBLICATIONS

Alcohol Wipe Fixture Diagram, May 3, 1996.

*Primary Examiner*—Gary K. Graham
*Attorney, Agent, or Firm*—Brooks & Kushman P.C.

[57] ABSTRACT

A contour following tool for preparing the surface of a workpiece is disclosed. The tool has axially shiftable pins that are biased toward a position in which they are fully extended from a housing. As the tool is moved relative to the workpiece, changes in the contoured surface of the workpiece are accommodated by allowing the pins to shift back from their fully extended position against the biasing force. The pins may be biased by a fluid under pressure or by springs. The tool may be used with a wiping cloth or end caps that may apply a cleaning fluid that is applied either externally or internally through the tool through a bore formed in one or more of the pins. A method of cleaning a contoured workpiece is also disclosed.

15 Claims, 3 Drawing Sheets

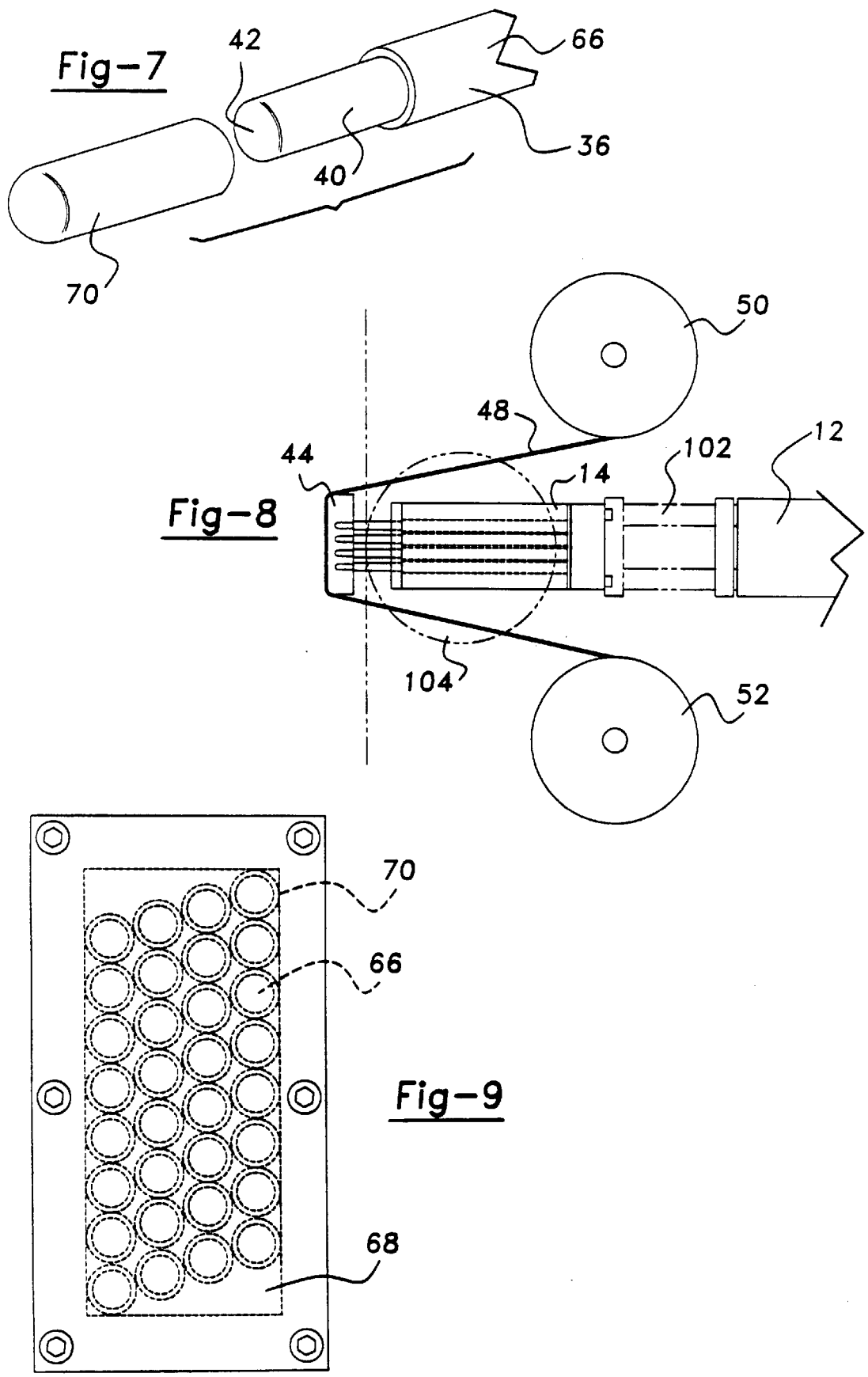

APPARATUS FOR PREPARING THE SURFACE OF A CONTOURED ARTICLE

TECHNICAL FIELD

The present invention relates to a method and apparatus for preparing a contoured surface.

BACKGROUND ART

Many products made on assembly lines, such as cars and trucks, are processed through a series of production steps. In many instances, it is necessary to clean a surface prior to performing a step such as the application of adhesively secured trim pieces or pinstripes. Problems are presented when the article has complex contours that are not continuous along the length of the vehicle.

Fixtures for cleaning contoured surfaces have been developed that include a rigid urethane foam applicator that is cut to the contour of a portion of a particular vehicle. A towel fed between two spools passes between the vehicle and the applicator. The applicator has a defined contour which cannot change as the contours along the length of the vehicle change. This may result in portions of the body being missed by the applicator. Also, the applicator may contact the surface with excessive force when the contour changes along the length of the vehicle. With a rigid applicator, the applicator must be replaced relatively frequently due to wear.

Prior art surface preparation fixtures are also affected by misalignment of the vehicle or if the vehicle pitches or yaws as it moves down an assembly line. The known prior art fixtures are difficult to adjust and cannot conform to changing contours.

These and other problems associated with prior art methods and apparatus for preparing contoured surfaces are addressed by this invention as summarized below.

SUMMARY OF THE INVENTION

It is an object of the present invention to provide a contour following tool for preparing the surface of a vehicle moving on an assembly line prior to application of adhesively applied trim or pinstripes.

It is another object of the present invention to provide a contour conforming tool for other processes.

According to another object of the invention, a contour conforming tool is provided which applies controlled pressure to a plurality of pins which are biased into engagement with the workpiece but which are partially retracted upon contact with a contoured surface.

Another object of the present invention is to provide a contour following tool which applies uniform pressure through a plurality of pins with the quantity of pressure applied being adjustable overall.

It is still another object of the present invention is to provide a self-equalizing contour following tool.

It is a further object of the invention to provide a contour following tool having a plurality of pins which are biased by means of pneumatic, hydraulic, mechanical, or electromechanical systems.

It is yet another object of the present invention to provide a contour following tool for preparing the surface of a vehicle on an assembly line which includes an integral cleaning fluid dispensing mechanism which dispenses cleaning fluid through one or more of a plurality of pins that follow the contour of the surface to be prepared.

Still further, it is another object of the present invention to provide a resilient, elastomeric cap for one or more pins of a contour following tool.

It is a further object of the invention to provide a contour following tool which works in conjunction with a cloth web that is moved across the contour following tool.

According to another aspect of the invention, a contour following tool is provided which includes a housing and a plurality of pins partially disposed within the housing. Each of the plurality of pins has a longitudinal axis and is axially shiftable. A biasing system is operative to apply a biasing force to each of the pins to shift the pins to an extended position. The pins are axially shiftable against the biasing force to follow a contoured surface. The biasing system may be either a pneumatic pressure system, a hydraulic system, a mechanical spring, or an electromechanical force applying mechanism.

According to another aspect of the invention, a contour following tool as described above is provided which also includes a fluid port for supplying cleaning fluid which passes through one or more of the pins.

Another aspect of the present invention to provide a resilient or elastomer cap which is attached to a distal end of one or more of the pins. The resilient cap may be made of felt, foam polyurethane, polyurethane, cloth, or a foam elastomer.

According to another aspect of the invention, a cleaning fluid may be applied by means of a spray or drip dispenser external of the contour following tool.

According to another aspect of the invention, a fixture having an arm is provided for cleaning a contoured surface. A tool attached to the distal end of the arm has a plurality of axially movable pins which are biased to extend from the tool and are axially shiftable toward a retracted position against the biasing force. The fixture also preferably includes a wiping medium disposed to be backed up by the pins as the wiping medium is placed in contact with the contoured surface to be cleaned. The fixture may be a robot having six axes of motion or may be a fixture of less sophisticated design.

According to another aspect of the invention, a method of cleaning a contoured workpiece is disclosed in which a robot or fixture having an arm supports a housing. A plurality of pins are partially disposed within the housing and are axially shiftable to extend from the housing. The method includes the step of biasing the pins into an extended position. The method also includes the step of providing a fluid retaining member between a distal end of the plurality of pins and the contoured workpiece to be cleaned with the pins serving to back up the fluid retaining member. The method includes the step of wiping the contoured workpiece with the fluid retaining member as the workpiece and arm move relative to each other. The pins are shifted axially in response to changes in the contours of the workpiece as the workpiece moves relative to the arm.

Other aspects of the method of the present invention include dispensing the cleaning fluid onto the fluid retaining member.

Further, the method includes the step of biasing the pins into an extended position by providing pneumatic pressure to a chamber which acts upon the pins.

According to another aspect of the invention, the step of providing a fluid retaining member further comprises advancing a web across the distal end of the pins to provide a fresh surface for wiping the workpiece.

BRIEF DESCRIPTION OF THE DRAWINGS

These and other objects, features, and advantages of the present invention will be readily apparent from the following detailed description of the best mode for carrying out the invention when taken in connection with the accompanying drawings.

FIG. 7 is a perspective view of a pin of the contour following tool of the present invention showing the pins in conjunction with a cap;

FIG. 8 is a top plan view of the contour following tool attached to the arm of a fixture or robot; and FIG. 9 is a front elevation view of the contour following tool.

DETAILED DESCRIPTION OF THE PREFERRED EMBODIMENT

Figure 1:
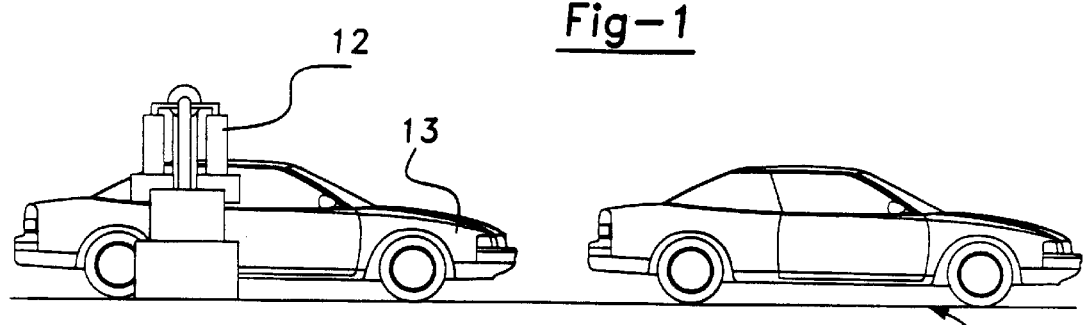
FIG. 1 is a side elevation view of an automobile assembly line showing vehicles being cleaned by a fixture utilizing a contour following tool to prepare the surface of the vehicle.

Referring now to FIG. 1, an automotive assembly line 10 is shown which includes a fixture 12, or robot, for preparing contoured surfaces of a vehicle 13 for adhesive application of trim pieces or pinstripes.

Figure 2:
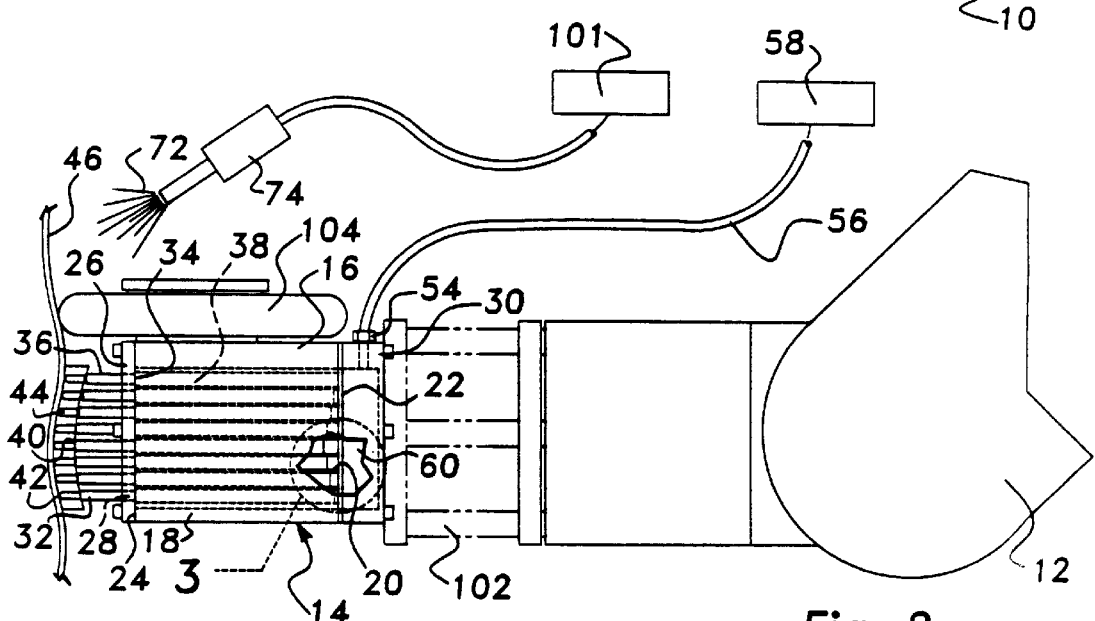
FIG. 2 is a front elevation view partially fragmented away showing a contour following tool attached to the arm of a fixture or robot.
Figure 3:
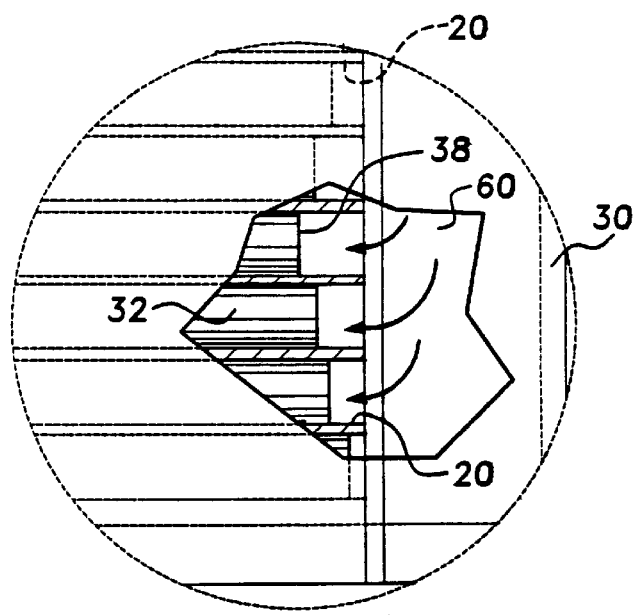
FIG. 3 is a magnified view taken of the area within the circle 3 in FIG. 2 showing a portion of the contour following tool.

As shown in FIGS. 2 and 8, a contour following tool 14 is held by the fixture 12 for engaging the portion of the vehicle 13 to be cleaned by an alcohol wipe preparation step.

The structure of the tool 14 is shown in FIGS. 2–9 to include a housing 16 which is formed from a block 18 of steel or other suitable material by drilling a plurality of bores 20 through the block 18 from a rear side 22 to a front side 24 in a substantially parallel array. The block 18 may be formed as a unitary body or in several parts. An end cap 26 is secured by appropriate fasteners to the front side 24. The end cap 26 has holes 28 formed at locations corresponding to the bores 20. The holes 28 are slightly smaller than the bores 18. A cover 30 is secured by appropriate fasteners to the rear side 22 of the block 18.

A plurality of pins 32 having a longitudinal axis are retained partially within the housing 16 and are disposed in the bores 20 and extend through the holes 28 in the end cap 26. The pins 32 each have a shoulder 34 formed intermediate their length. The shoulders 34 form a step at the juncture of a front portion 36 of the pin having a diameter corresponding to but slightly less than the diameter of holes 28, and a rear portion 38 of the pin having a diameter corresponding to but slightly less than the diameter of bores 20. The pins 32 are axially shiftable, and the fit between the rear portion 38 of the pins 32 and the bores 20 is a close tolerance fit to substantially establish a seal in the pneumatic and hydraulic embodiments of the invention as will be more fully described below. The pins 32 may also have a further reduced diameter section 40 at their distal end 42 or other structure to facilitate securing a resilient cap 44 to one or more of the pins 32.

The resilient cap 44 is used to provide a soft element for engaging a contoured surface 46 of a vehicle or other object to be processed by the tool 14. The cap 44 may be formed from any number of different materials, including but not limited to felt, foam polyurethane, poly urethane, cloth or elastomeric material. As shown in FIGS. 2, 4, 6, 7 and 8 the cap 44 may be attached to one pin, a subset of pins, or all of the pins 32.

Referring to FIG. 8, the use of the tool 14 is shown in conjunction with a cloth 48 covering the cap 44. The cloth 48 may be advanced from a dispensing roll 50 and collected by a take up roll 52. In this way dirt and foreign materials may be removed from the contoured surface 46 and collected on the cloth 48.

Figure 4:
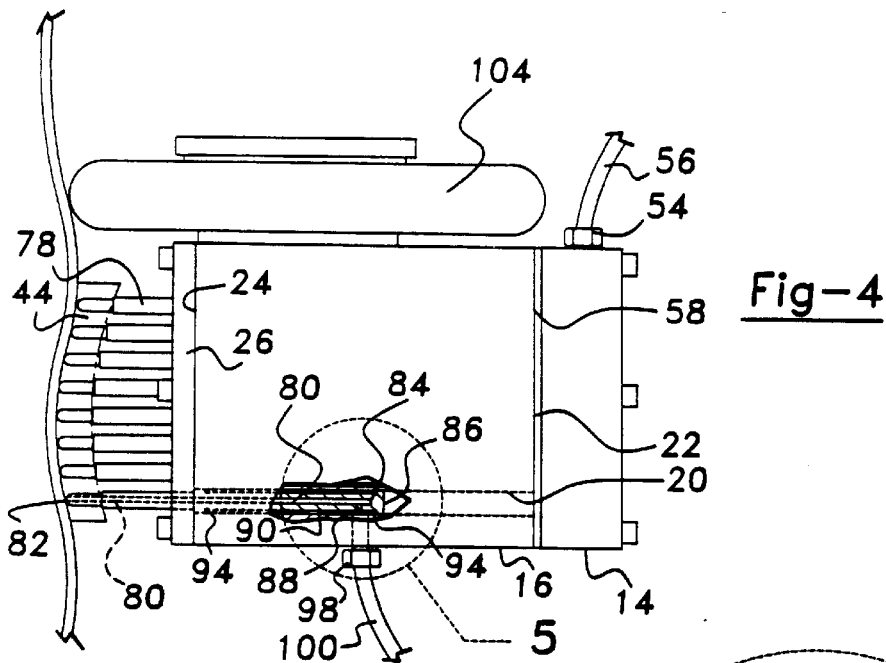
FIG. 4 is a front elevation view partially fragmented away of a contour following tool having a fluid dispensing port within a pin of the contour following tool.
Figure 5:
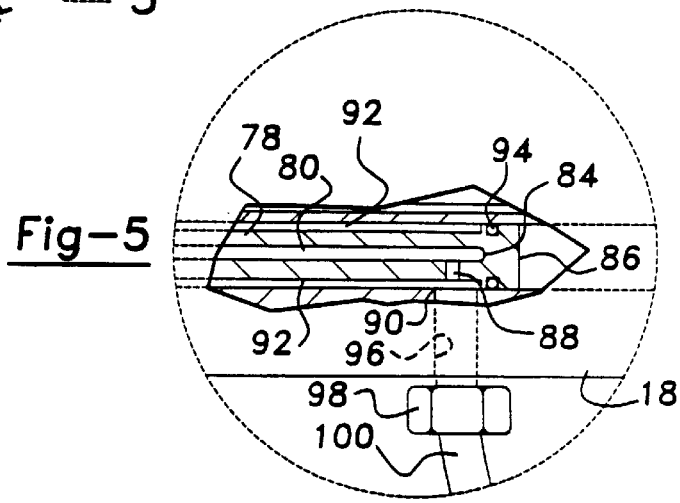
FIG. 5 is a magnified view taken of the area within the circle 5 in FIG. 4 showing the fluid dispensing port.
Figure 6:
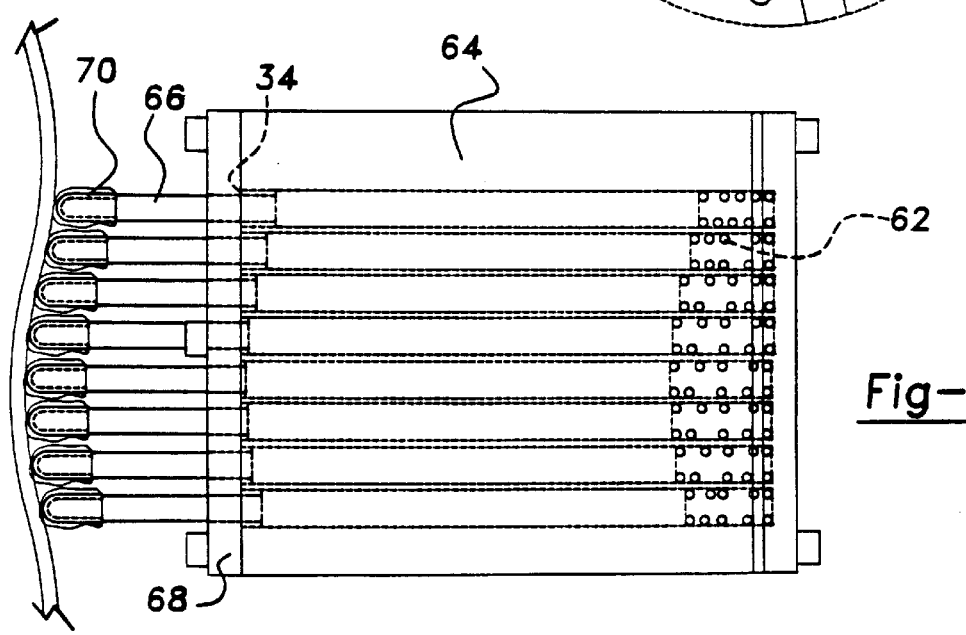
FIG. 6 is a side elevation view of an alternative embodiment of the contour following tool of the present invention wherein springs are the mechanical biasing mechanism used to bias the pins into an extended position.

Referring to FIGS. 2 through 5, the embodiment of the invention in which the pins 32 are biased by fluid pressure toward a fully extended position wherein the shoulder 34 is in engagement with the end cap 26 and the caps 44 are biased toward the contoured surface 46 is shown. The fluid pressure may be provided by a pneumatic pressure source or a hydraulic pressure source. Alternatively, it is anticipated that a modification of the design could be made wherein a vacuum source could provide the fluid pressure. The fluid pressure causes the pins 32 to be axially shifted within the bores 20 to a first position in which the pins are extended to a maximum extent from the housing 16. This is the position shown in FIG. 8 in which the tool 14 is out of engagement with the contoured surface 46. As shown in FIGS. 2, 4 and 6, upon engagement with the contoured surface 46 the pins are shifted against the biasing force back into the housing 16 to accommodate changes in the contour of the object to be processed as it moves relative to the tool 14. In the case of the pneumatic pressure source, the pneumatic medium (e.g., air) creates a self-equalizing force on the pins.

The cover 30 has a fitting 54 through which the fluid pressure is supplied which is adapted to be connected to a hose 56 that is connected to a source of fluid pressure. A seal 58 is provided between the cover and the block 18 to form a seal therebetween. The space between the cover on one hand and the block 18 and pins 32 on the other hand acts as a plenum 60 through which fluid pressure may be communicated to the pins 32. The plenum 60 may be small in volume.

In the alternative embodiment shown in FIGS. 6, 7 and 9, the biasing force is provided by helical springs 62. It is anticipated that other equivalent mechanical elements such as magnets or solenoids could be substituted for the spring 62. In this alternative embodiment the housing 64 may be of an open construction since it in not necessary to provide a pressure seal with a mechanical biasing force applying member. The pins 66, end cap 68 and cap 70 all perform in a manner similar to the fluid pressure biasing embodiment previously described and will not be repeated for brevity.

In some applications, effective cleaning requires application of a cleaning fluid 72 on the cloth 48 or cap 44. An appropriate cleaning fluid for automotive assembly line surface preparation may be alcohol or an alcohol solution. The method of applying the cleaning fluid may include a drip or spray applicator 74 as shown in FIG. 2. According to another aspect of the invention the cleaning fluid may be supplied through one or more fluid dispensing pins 78 as shown in FIGS. 4 and 5.

Each fluid dispensing pin 78 has a small bore 80 extending axially from a distal end 82 of the pin 78 to a location 84 within the pin 78 proximate the opposite end 86. A radial bore 88 extends from the bore 80 near the location 84 to the outside of the pin 78. A multiple position fluid transfer fitting 90 is formed about the pin 78 by providing an annular space 92 with seals 94 at opposite ends of the annular space 92. Cleaning fluid is supplied through a port 96 formed in the block 18. A fitting 98 is connected to the port 96 to facilitate connection to a hose 100 which supplies cleaning fluid from a reservoir 101 or other conventional source. Cleaning fluid 72 is supplied through the pin 78 regardless of the position of the pin 78 because fluid can flow through the port 96 into the annular space 92 throughout the full range of pin displacement. Fluid in the annular space is then provided through the radial bore 88 to the bore 80 and to the distal end 82. If the cap 44 is porous the fluid may pass through the cap 44 or if the cap is formed of a nonporous material, such as an elastomer, one or more holes may be provided to allow the fluid to be supplied to the cloth 48.

In some applications the spacing between the fixture 12 supporting the tool 14 and the contoured surface 46 may vary significantly. To ensure proper location of the tool, a self-equalizing slide 102 of conventional design, as shown in FIGS. 2 and 8, may be secured between the fixture 12 and the tool 14. On automotive assembly lines 10 after vehicles 13 have been fully assembled and are supported on their wheels variation in positioning and pitching of the vehicle caused by external forces may require 2 inches or more of tolerance. Since the pin displacement is anticipated to be designed for 1 to 1.5 inches, the use of a self-equalizing slide 102 may be required for some applications.

A positioning roller 104, as shown in FIGS. 2, 4 and 8 may also be required to aid in positioning the tool 14. The roller 104 preferably has bearings to improve tool life and reduce the possibility of scratching the surface of a vehicle. The perimeter of the roller 104 preferably extends partially over the pins when they are in their fully extended position. The roller 104 allows the tool 14 to ride over transitions in body panels.

While several alternative embodiments of the invention have been disclosed above, it should be understood that other applications may be developed for the invention and other improvements may be made by persons of skill in the art. The above description of several embodiments should not be read to limit the scope of the invention to that which is disclosed. The broad scope of the invention should be interpreted by reference to the following claims.

What is claimed is:

1. A contour following tool comprising:
   a housing, a plurality of openings in the housing;
   a plurality of pins at least partially disposed within the openings in the housing, each pin having a longitudinal axis and being axially shiftable;
   a pneumatic system operative to apply a pneumatic biasing force to each of the pins;
   the pneumatic system including a pressurized pneumatic chamber, the pins extending into the pneumatic chamber, the pins thereby being shifted toward a position in which the pins are extended to maximum extent from the housing, the pins being axially shiftable against the biasing force to follow a contoured surface.

2. The contour following tool of claim 1 wherein the pins have a shoulder which limits the axial movement of the pins and retains the pins partially within the housing.

3. The contour following tool of claim 1 wherein at least one of the pins has a fluid port defined within the pin, and a fluid is supplied to the pin through the housing to be dispensed from a distal end of the pin.

4. The contour following tool of claim 3 wherein a multiple position fluid transfer fitting receives the pin having a fluid port and wherein fluid is supplied to the multiple position fluid transfer fitting by a port which extends through a wall of the housing.

5. The contour following tool of claim 1 wherein at least one of the pins has a resilient cap attached to a distal end thereof.

6. The contour following tool of claim 5 wherein the resilient cap is made of a material selected from the group comprising: felt, foam polyurethane, polyurethane, cloth, or foam elastomer.

7. The contour following tool of claim 5 wherein the resilient cap is secured to a plurality of pins.

8. A contour following tool comprising:
   a housing, a plurality of openings in the housing;
   a plurality of pins at least partially disposed within the openings in the housing, each pin having a longitudinal axis and being shiftable axially;
   a system operative to apply a biasing force to each of the pins to shift the pins toward a position in which the pins are extended to maximum extent from the housing, the pins being axially shiftable against the biasing force to follow a contoured surface; and
   a fluid dispensing mechanism adjacent the distal end of the pins which dispenses a fluid upon a fluid retaining member retained adjacent the distal end of the pins, the fluid retaining member being a cloth web having the fluid applied thereto and engaging the distal ends of the pins, the cloth web being carried by dispensing rolls, the cloth web being fed by the rolls across the distal ends of the pins to provide a renewed section of the cloth web which is backed by the pins.

9. The contour following tool of claim 8 wherein the system operative to apply a biasing force is a spring associated with each of the pins.

10. The contour following tool of claim 8 wherein the system operative to apply a biasing force is a hydraulic system wherein the housing defines a chamber to which a hydraulic fluid is supplied and the pins extend into the chamber whereby the biasing force is applied to the pins.

11. An apparatus for cleaning a contoured surface comprising:
    a fixture having an arm;
    a tool attached to the distal end of the arm, the tool having a housing, openings in the housing receiving a plurality of axially movable pins, a pneumatic chamber in the housing with a controlled air pressure therein, the pins extending into the pneumatic chamber whereby a biasing force created on the pins extends the pins from the housing, the pins being axially shiftable toward a retracted position against the biasing force acting upon the pins; and
    a wiping medium disposed to be backed up by the pins as it is placed in contact with the contoured surface to be cleaned.

12. The apparatus of claim 11 wherein said fixture is a robot.

13. A contour conforming tool for preparing a work surface comprising:
    a housing defining a chamber;
    a source of pressure transmitting fluid, said chamber being selectively supplied with the pressure transmitting fluid; and a plurality of axially shiftable pins partially disposed within channels formed in the housing, each of said pins having a first end extending through an opening formed in a wall of the housing and a second end being disposed in the chamber in the housing to be biased by the pressure transmitting fluid to an extended position in which the pins are extended through the openings in the housing;

said pins being oriented to contact the work surface, the pins being held in an extended position when the chamber is supplied with the pressure transmitting fluid, the pins being axially shiftable to retract into the housing upon contact with the workpiece against the biasing force exerted by the pressure transmitting fluid.

14. A contour following mechanism comprising:

a housing, a plurality of openings in the housing;

a plurality of pins at least partially disposed in the housing, each pin having a longitudinal axis and being axially shiftable;

a system operative to apply a separate biasing force to each of the pins to shift the pins toward a position in which the pins are extended to maximum extent from the housing, the pins being shiftable axially against the biasing force to follow a contoured surface;

the system operative to apply a biasing force being a pneumatic pressure system wherein the housing defines a chamber to which air is supplied at a controlled pressure, the pins extending into the chamber whereby a biasing force is applied to the pins;

the openings in the housing having a cylindrical inner wall and the pins received in the openings having a cylindrical outer wall with a clearance space between the walls whereby the pins are shifted within the openings by the pressure of the gas.

15. A contour following mechanism comprising:

a housing, a plurality of openings in the housing;

a plurality of pins at least partially disposed within the openings in the housing, each pin having a longitudinal axis and being axially shiftable, the pins and the openings having a clearance space therebetween;

a system operative to apply a biasing force to each of the pins to shift the pins toward a position in which the pins are extended to maximum extent from the housing, the pins being axially shiftable against the biasing force to follow a contoured surface;

the system operative to apply a biasing force being a pneumatic pressure system wherein the housing defines a chamber to which gas is supplied at a controlled pressure, the pins extending into the chamber resulting in a pneumatic biasing force applied to the pins, thereby providing a self-equalizing contour-following pin assembly.

* * * * *